(12) United States Patent
Zimmermann et al.

(10) Patent No.: US 7,312,820 B2
(45) Date of Patent: *Dec. 25, 2007

(54) METHOD AND APPARATUS FOR PROVIDING VIRTUAL PROCESSING EFFECTS FOR WIDE-ANGLE VIDEO IMAGES

(75) Inventors: Steven Dwain Zimmermann, Knoxville, TN (US); Christopher Shannon Gourley, Philadelphia, TN (US)

(73) Assignee: IPIX Corporation, Oak Ridge, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/898,865

(22) Filed: Jul. 26, 2004

(65) Prior Publication Data

US 2005/0007483 A1    Jan. 13, 2005

Related U.S. Application Data

(63) Continuation of application No. 09/546,659, filed on Apr. 10, 2000, now Pat. No. 6,778,211.

(60) Provisional application No. 60/128,613, filed on Apr. 8, 1999.

(51) Int. Cl.
*H04N 5/225* (2006.01)
*H04N 5/262* (2006.01)
*H04N 7/00* (2006.01)
*H04N 7/18* (2006.01)
*G06K 9/32* (2006.01)
*G09G 5/00* (2006.01)

(52) U.S. Cl. ............... 348/218.1; 348/239; 348/36; 348/39; 348/143; 382/294; 345/629

(58) Field of Classification Search ............ 348/39, 348/218.1, 143–153; 345/629–634
See application file for complete search history.

(56) References Cited

U.S. PATENT DOCUMENTS

| 4,549,208 | A | * | 10/1985 | Kamejima et al. ............ 348/36 |
| 4,656,506 | A | | 4/1987 | Ritchey |
| 4,670,648 | A | | 6/1987 | Hall et al. |
| 4,868,682 | A | | 9/1989 | Shimizu et al. |
| 5,023,725 | A | * | 6/1991 | McCutchen ............... 348/38 |

(Continued)

FOREIGN PATENT DOCUMENTS

DE    9108593.4    11/1991

(Continued)

OTHER PUBLICATIONS

Office Action dated Mar. 13, 2002 for U.S. Appl. No. 09/546,331.

(Continued)

*Primary Examiner*—David Ometz
*Assistant Examiner*—Nhan Tran
(74) *Attorney, Agent, or Firm*—MH2 Technology Law Group

(57) ABSTRACT

A method and apparatus is disclosed for providing special effects for wide-angle video images. The special effects include replacing a selected portion of a wide-angle video image with a predetermined image or an associated portion of a video image captured in a subsequent frame. Other special effects include image intensity scaling for wide-angle video images.

20 Claims, 9 Drawing Sheets

U.S. PATENT DOCUMENTS

| | | |
|---|---|---|
| 5,130,794 A | 7/1992 | Ritchey |
| 5,155,638 A | 10/1992 | Aikawa et al. |
| 5,155,683 A | 10/1992 | Rahim |
| 5,185,667 A | 2/1993 | Zimmermann |
| 5,262,856 A | 11/1993 | Lippman et al. |
| 5,359,363 A | 10/1994 | Kuban et al. |
| 5,481,257 A | 1/1996 | Brubaker et al. |
| 5,495,576 A | 2/1996 | Ritchey |
| 5,497,960 A | 3/1996 | Previnaire |
| 5,555,019 A * | 9/1996 | Dole .......................... 348/148 |
| 5,579,026 A | 11/1996 | Tabata |
| 5,596,319 A | 1/1997 | Spry |
| 5,625,489 A | 4/1997 | Glenn |
| 5,657,073 A | 8/1997 | Henley |
| 5,691,765 A | 11/1997 | Schieltz et al. |
| 5,703,604 A | 12/1997 | McCutchen |
| 5,706,421 A | 1/1998 | Reber et al. |
| 5,784,498 A * | 7/1998 | Venable ...................... 382/254 |
| 5,850,471 A | 12/1998 | Brett |
| 5,877,801 A | 3/1999 | Martin et al. |
| 5,894,589 A | 4/1999 | Reber et al. |
| 5,940,126 A | 8/1999 | Kimura |
| 5,988,818 A | 11/1999 | Fujimori et al. |
| 5,990,941 A | 11/1999 | Jackson et al. |
| 6,002,430 A * | 12/1999 | McCall et al. ............. 348/143 |
| 6,005,611 A | 12/1999 | Gullichsen et al. |
| 6,020,931 A | 2/2000 | Bilbrey et al. |
| 6,128,143 A * | 10/2000 | Nalwa ......................... 348/39 |
| 6,147,797 A | 11/2000 | Lee |
| 6,211,913 B1 * | 4/2001 | Hansen et al. ............. 348/239 |
| 6,222,675 B1 * | 4/2001 | Mall et al. .................... 345/7 |
| 6,278,461 B1 | 8/2001 | Ellenby et al. |
| 6,315,667 B1 | 11/2001 | Steinhart |
| 6,333,826 B1 | 12/2001 | Charles |
| 6,480,230 B1 * | 11/2002 | Honma ....................... 348/452 |
| 6,685,366 B1 * | 2/2004 | Corbin ....................... 348/143 |
| 6,778,211 B1 * | 8/2004 | Zimmermann et al. .. 348/218.1 |

FOREIGN PATENT DOCUMENTS

| | | |
|---|---|---|
| EP | 0522204 A1 | 1/1993 |
| EP | 0607050 A1 | 7/1994 |
| FR | 2661061 A | 10/1991 |
| GB | 2289820 A | 5/1995 |
| WO | WO89/03076 | 4/1989 |
| WO | WO94/16406 | 7/1994 |
| WO | WO96/13962 | 5/1996 |
| WO | WO97/01241 A | 1/1997 |
| WO | WO98/38590 | 9/1998 |
| WO | WO00/60853 | 10/2000 |
| WO | WO00/60857 | 10/2000 |
| WO | WO00/60869 | 10/2000 |
| WO | WO00/60870 | 10/2000 |

OTHER PUBLICATIONS

Office Action dated Nov. 19, 2002 for U.S. Appl. No. 09/546,331.
Office Action dated Jun. 19, 2003 for U.S. Appl. No. 09/546,183.
Office Action dated Oct. 7, 2003 for U.S. Appl. No. 09/546,659.
International Search Report dated Jul. 27, 2000 for PCT/US 00/09464.
Tan, et al., A Robust Sequential Approach for the Detection of Defective Pixels in an Image Sensor, Mar. 15, 1999; IEEE; Acoustics, Speech, and Signal Processing, 1999. Proceedings., 1999 IEEE International Conference on; vol. 4; pp. 2239-2242.

* cited by examiner

METHOD AND APPARATUS FOR PROVIDING VIRTUAL PROCESSING EFFECTS FOR WIDE-ANGLE VIDEO IMAGES

This application is a continuation of application Ser. No. 09/546,659, filed Apr. 10, 2000, now U.S. Pat. No. 6,778, 211 which claims the benefit of provisional patent application Ser. No. 60/128,613, filed Apr. 8, 1999. This application also incorporates by reference the following U.S. patent applications filed on Apr. 10, 2000: Ser. No. 09/546,183, entitled "Remote Platform for Camera"; Ser. No. 09/546, 331, entitled "Virtual Theater"; and Ser. No. 09/546,537, entitled "Immersive Video Presentations". Also, U.S. Pat. Nos. 5,990,941 and 6,002,430 are incorporated by reference.

TECHNICAL FIELD OF THE INVENTION

The present invention generally relates to processing effects for wide-angle images. More particularly, the present invention relates to special effects processing that provides image portion replacement for wide-angle video images, shifted image portion replacement for wide-angle video images and other special effects for wide-angle video.

BACKGROUND OF THE INVENTION

A goal of imaging technology is to make the observer feel as though he or she is part of an image. U.S. Pat. Nos. 5,990,941 and 6,002,430, currently assigned to the assignee of the present application, describe wide-angle image viewing systems and methods. The patents provide full freedom viewing inside of a complete spherical image composed of one or two combined hemispheric images. As a result, there are no bounds on the user's freedom to view in any direction.

U.S. Pat. No. 6,002,430 patent discusses techniques for capturing first and second images, each having a field-of-view of 180 degrees or greater. In one embodiment two cameras are placed in a "back-to-back" arrangement having lenses with a 180 degree or greater field of view (e.g., fisheye lenses). An imaging element or elements capture the images from each lens. The captured images are seamed together to form a single spherical image. Also, U.S. Pat. No. 6,002,430 patent includes a viewing engine that provides a real-time interactive image window that can be directed anywhere in the spherical image. Preferably, a personal computer system runs perspective correction algorithms to create the image window. Other wide-angle viewing systems are known, but known systems generally do not provide special effects for wide-angle video images.

Reber et al., in U.S. Pat. No. 5,706,421, discloses placing an animated character in a wide-angle image. An animated character generator superimposes the animated character onto a perspective corrected image in a spherical wide-angle image. However, the animated character is over-laid on the spherical image, and the Reber et al. does not disclose performing special effects on non-perspective corrected images in wide-angle video images.

Special effects can be used to enhance the quality of video images and a need exists for providing special effects for wide-angle video images.

SUMMARY OF THE INVENTION

An aspect of the present invention is to provide an apparatus and methods that provides special effects for wide-angle video images.

In accordance with the principles of the present invention, a method is provided for capturing wide-angle video that includes a plurality of sequential frames, each frame having at least one wide-angle image, and replacing a portion of at least one of each wide-angle image in at least one of the frames with a replacement image. The step of replacing a portion of at least one of each wide-angle image includes replacing the portion with a portion of a wide-angle image in a second frame captured subsequently to the frame having the replaced portion. The portion of the image in the second frame may have the same shape as the replaced portion and represents an unobstructed view of the surrounding environment. Alternatively, the step of replacing a portion of at least one of each wide-angle image includes replacing the portion with a planar image that is warped to the same curvature of the replaced portion and has the same shape as the replaced portion.

In accordance with the principles of the present invention, an apparatus is provided that includes a wide-angle video image capture device that captures wide-angle video in a plurality of sequential frames, each frame having at least one wide-angle image, and preprocessing circuitry that receives digital wide-angle video images of the at least one wide-angle image in each frame and replaces a selected portion of at least one of each wide-angle image in at least one of said frames with a replacement image. The replacement image includes a selected portion of a wide-angle image in a second frame captured subsequently from the frame having a replaced portion. The selected portion of the replacement image has substantially the same shape as the replaced portion and represents an unobstructed view of the surrounding environment. Alternatively, the replacement image is a planar image warped to the same curvature and having the same shape as the replaced portion.

In accordance with the principles of the present invention, a method and apparatus is provided for performing image-intensity scaling. A wide-angle video image is divided into a plurality of areas. An adaptive threshold, associated with the average image intensity of pixels in each area, is calculated for each area The intensity of a pixel in at least one of said areas is compared to the adaptive threshold for the area. The pixel intensity is adjusted, when the intensity is not equal to the adaptive threshold.

In accordance with the principles of the present invention, a method and apparatus is provided for detecting and removing flare. Preprocessing circuitry compares the change in intensity of pixels in each row of at least one wide-angle image in each frame to two threshold values to detect flare, and adds pixels in each frame to remove the detected flare.

BRIEF DESCRIPTION OF THE DRAWINGS

The invention is described in detail with regard to the following figures, wherein like numeral references refer to like elements, and wherein.

DETAILED DESCRIPTION OF THE INVENTION

Figure 1:
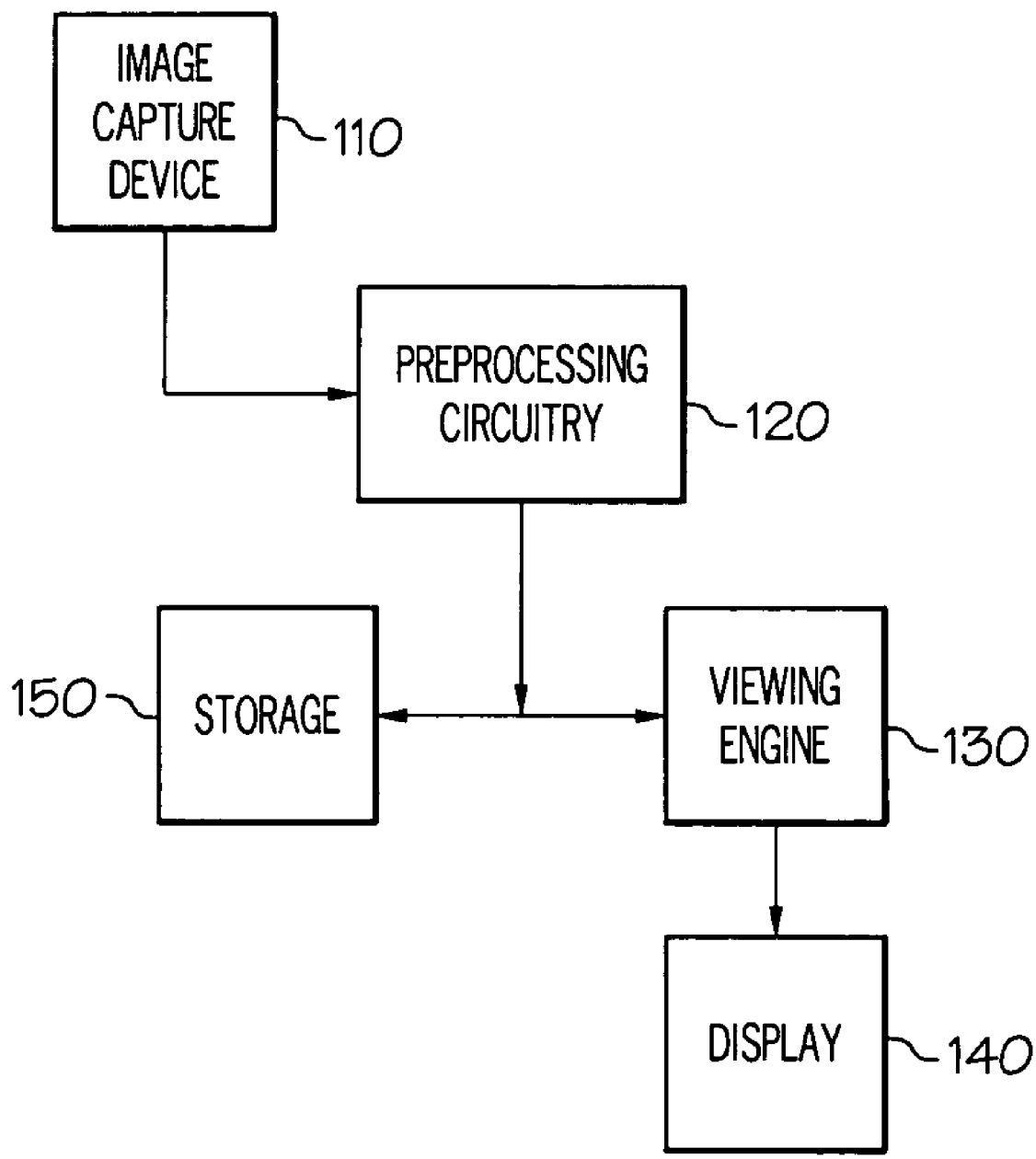
FIG. 1 is a schematic block diagram of a wide-angle video image system in accordance with embodiments of the present invention.

A system for creating wide-angle video images, such as spherical video images is shown in FIG. 1. Wide-angle video image system 100 includes video image capture system 110, preprocessing circuitry 120, viewing engine 130 connected to display monitor 140 and/or storage 150 connected to preprocessing section 120. Video images output from image capture system 110 are processed, possibly along with other data, in preprocessing circuitry 120. Preprocessing circuitry 120, for example, adds special effects to the received video images. The output of pre-processing circuitry can be stored in storage 150 and/or processed in viewing engine 130, such as the viewing engine disclosed in U.S. Pat. No. 6,002,430, for display.

Figure 2:
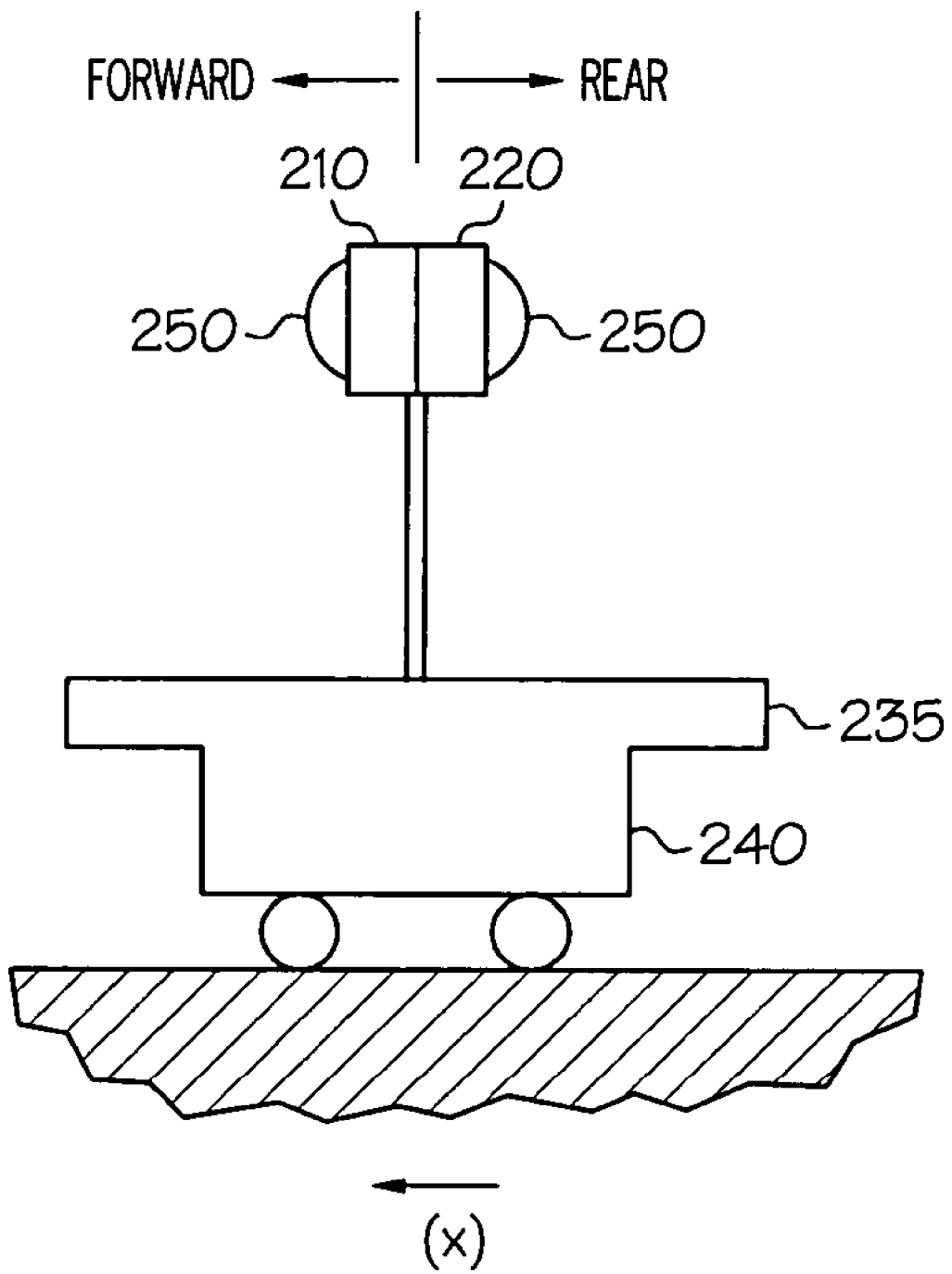
FIG. 2 is a schematic block diagram of an image capturing system in accordance with embodiments of the present invention.
Figure 11:
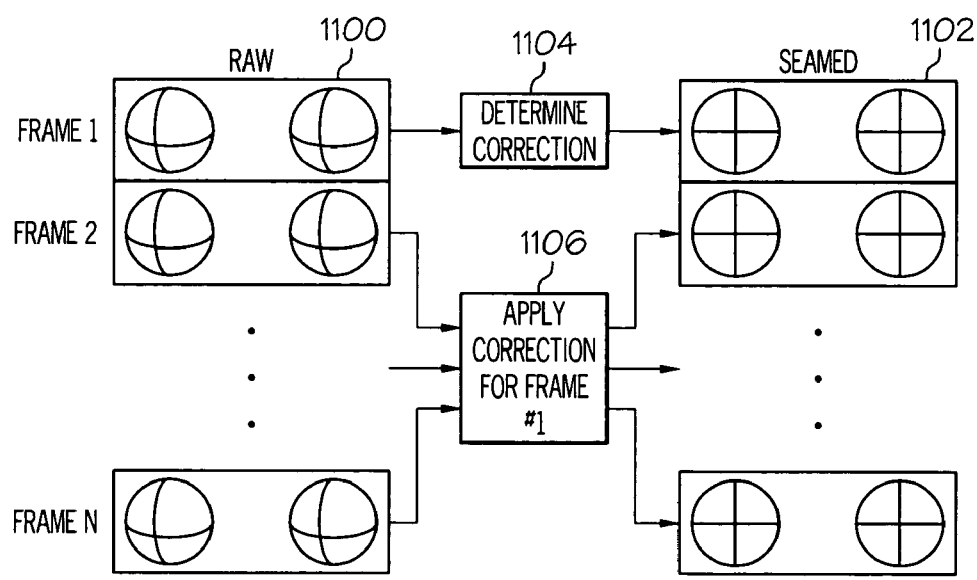
FIG. 11 illustrates a seaming operation according to embodiments of the invention.

Image capture system 110 captures at least one wide-angle image. For example, any of the video image capture systems described in co-pending U.S. patent application Ser. No. 09/546,537 may be used. The output of image capture system 110 may be frames of film, each frame including at least one wide-angle image. The video images are either captured with a digital image capture device or converted to digital images. For example, as described in co-pending U.S. patent application Ser. No. 09/546,537 and as illustrated in FIG. 2, an image capture device in image capturing system 110 may include two video cameras 210 and 220 having fisheye lenses 250 and placed in a back-to-back arrangement for simultaneously capturing two video images. Video cameras 210 and 220 can be mounted, for example, on a base 230 attached to robot platform 235 located on mobile robot 240. Other structures for supporting video image capture devices, such as a tripod, may be used, and other vehicles for carrying an image capture device, such as a helicopter (as described in U.S. patent application Ser. No. 09/546,183, entitled "Remote Platform for Camera" filed herewith), may be used. Video camera 210 is orientated to capture the environment towards the front of robot 240 and video camera 220 is oriented to capture the environment towards the rear of the robot 240. Video cameras, however, can be orientated in other opposing directions. For example, co-pending U.S. patent application Ser. No. 09/546,183 describes a platform on a robot for carrying an image capture device. Video cameras 210 and 220 capture the environment digitally or on film in two hemispheric images 310 and 320, which are eventually seamed together to form a spherical image 330 shown in FIG. 3B. According to one embodiment, as illustrated in FIG. 11, the raw video images of the first two hemispherical images 1100 can be corrected in 1104 and then seamed together using the correction determined in 1104 to form seamed images 1102. The next N frames can then be corrected using the correction determined for the first frame in 1106. Thus, the correction for every frame need not be determined. Rather, the correction factor need only be determined every 10, 20, 50, etc frames, as conditions dictate.

Image capture system 110 preferably records data representing pan, tilt and rotate coordinates of the image capture device simultaneously with the captured images. Similarly, time of day and date clock data may preferably be recorded simultaneously with captured images. Also, audio data may be recorded simultaneously with captured images. Preferably, a digital or electric microphone may record audio data and be mounted and directed in the same direction as a camera lens to capture the sounds coming from the direction of image capture as known in the motion picture and television programming arts.

Figure 9:
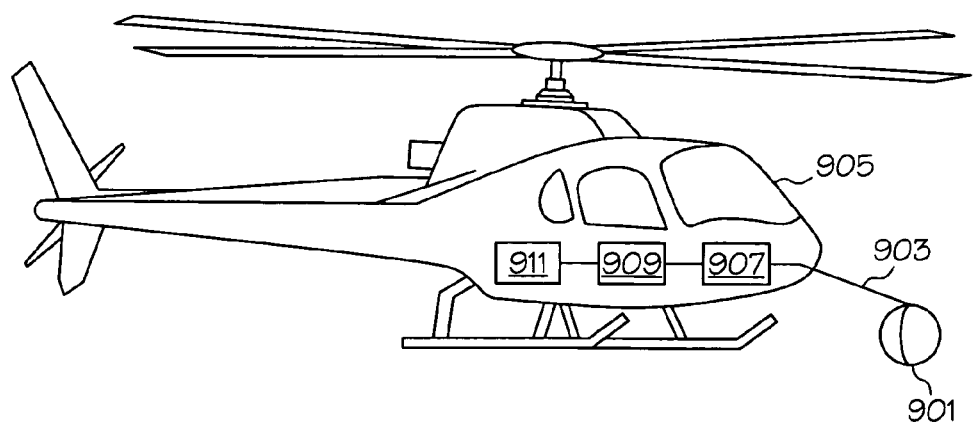
FIG. 9 illustrates a helicopter with a camera system mounted thereon according to embodiments of the present invention.

As described above, the camera system may be mounted on a vehicle such as a helicopter, as illustrated in FIG. 9. The camera system 901 is mounted on a camera mount 903 which is connected to the helicopter 905. The video and audio signals captured by the camera system 901 are recorded in a memory 909. The recorded signals can then be downloaded once the helicopter returns from the trip. Alternatively, some or all of the data can be transmitted back to a home base from the helicopter 905 using for example a transceiver 911. The recorded signals may be transferred to the transceiver 911 by a computer 909 connected to both the memory 907 and the transceiver 911. It will be understood that the memory 907 may be part of the computer 909. The recorded signals can be transmitted in either a corrected format or an uncorrected format, wherein the computer 909 performs the correction. In addition, the entire image signals can be transmitted using high resolution or low resolution. In addition, only part of the image signals need be transmitted back to the home base, for example, only the images from the forward looking camera or a portion of the images in the vicinity of the direction of view. One advantage of only transmitting a portion of the entire images is that the decrease in transmission time allows the vehicle to be remotely piloted over long distances.

Likewise, global positioning system data may be captured simultaneously with images or by pre-recording or post-recording the location data as is known from the surveying art. The precise latitude and longitude global coordinates of each image as it is captured can be recorded.

Figure 10:
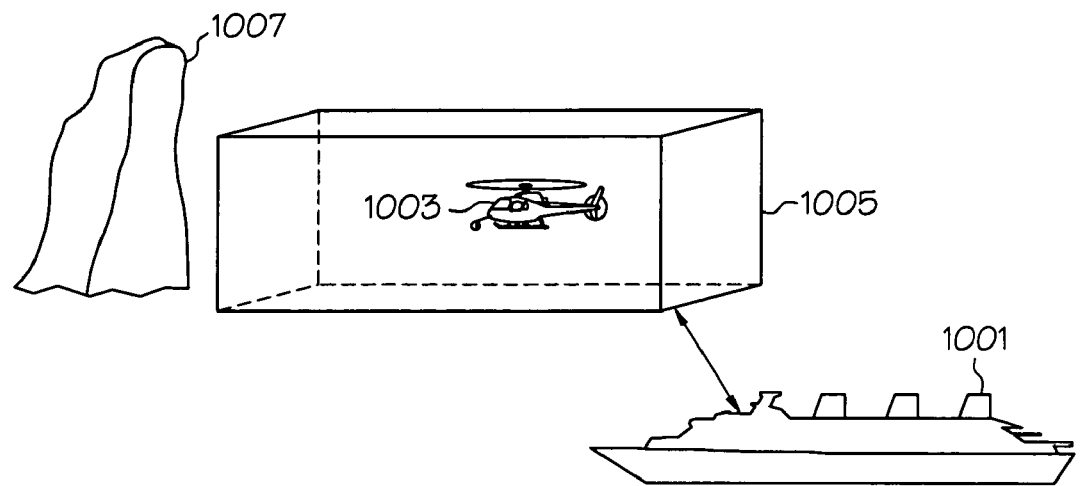
FIG. 10 illustrates creating a 3-dimensional area in which a helicopter can be controlled according to embodiments of the invention.

The global positioning system data may be used to create a 3-dimensional area in which a vehicle, such as a helicopter, can operate. For example, a cruise ship 1001 may offer passengers the ability to take a "virtual" helicopter ride to a nearby island 1007 as illustrated in FIG. 10. By using the global positioning system data, a box 1005 within which a helicopter 1003 can fly can be created. The passenger can then remotely pilot the helicopter within the defined box. The system can be defined such that if the helicopter leaves the box 1005, the helicopter will immediately return back into the box or return to the cruise ship.

Figure 4:
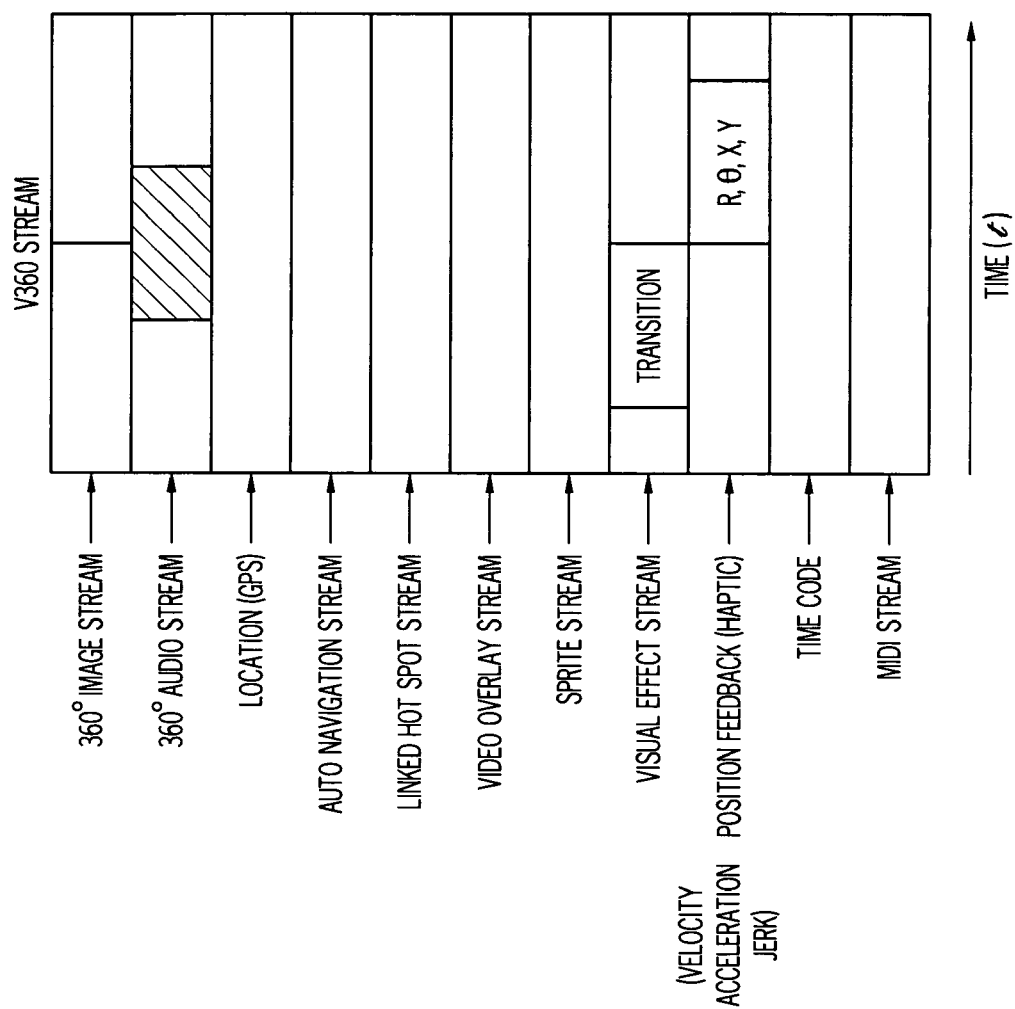
FIG. 4 represents a data structure of a video frame in accordance with embodiments of the present invention.

Preprocessing circuitry 120 performs special effects, described in the following sections, on the received wide-angle images. Also, preprocessing circuitry 120 includes a processor and memory that may be provided at the video capture system 110 or remotely at, for example, a personal computer. Preprocessing circuitry 120 can assemble received wide-angle video images and other recorded data, for example, in video frames having a data structure described in co-pending U.S. patent application Ser. No. 09/546,537 entitled "Immersive Video Presentations" and shown in FIG. 4. Also, preprocessing circuitry 120 may convert wide-angle video from image capture device 110 into conventional formats, such as AVI or MPEG.

The wide-angle video images, such as the hemispheric images, and associated data may be stored in storage section 150. Storage section 150 may include video tape, CD-ROM, semiconductor devices, magnetic or magneto-optical disks, or laser disks as the storage medium. Also, the wide-angle images may be displayed using viewing engine 130, which may include the viewing engine in U.S. Pat. No. 6,002,430 patent.

As described above, preprocessing circuitry 120 can provide special effects for wide-angle images captured by video image capture system 110. In a preferred embodiment of the present invention, an image portion replacement special effect for wide-angle images is provided using preprocessing circuitry 120.

Figure 3A:
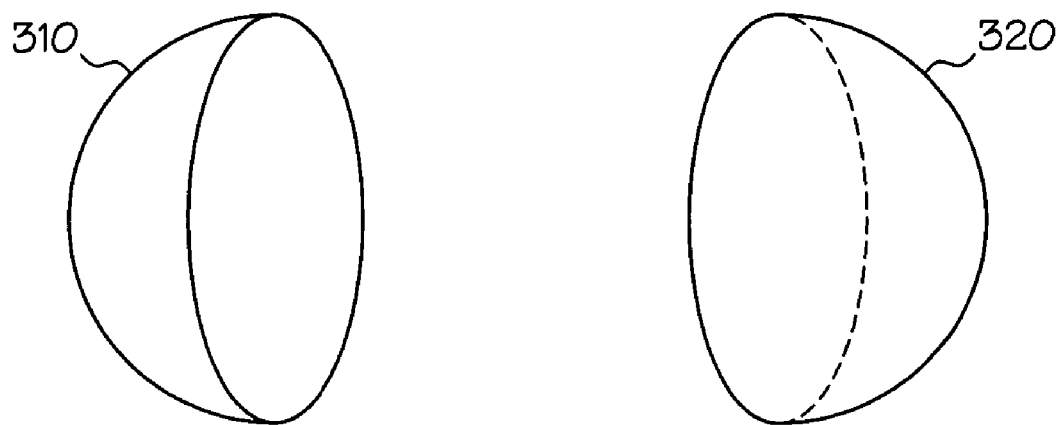
FIG. 3 represents two spherical images combined into a single spherical image in accordance with embodiments of the present invention.
Figure 3B:
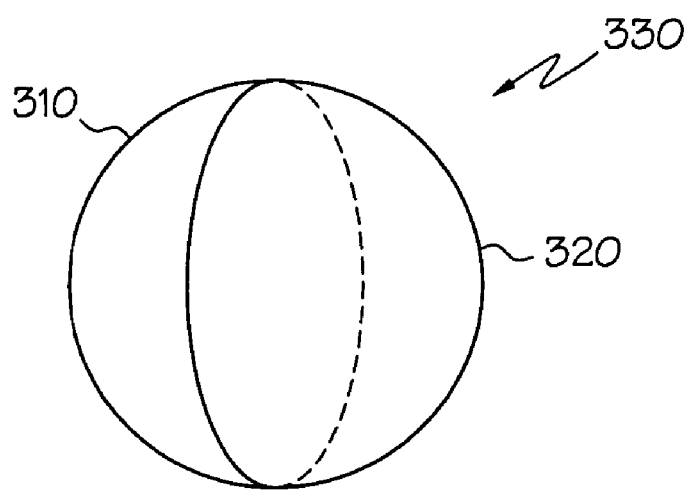
Figure 5:
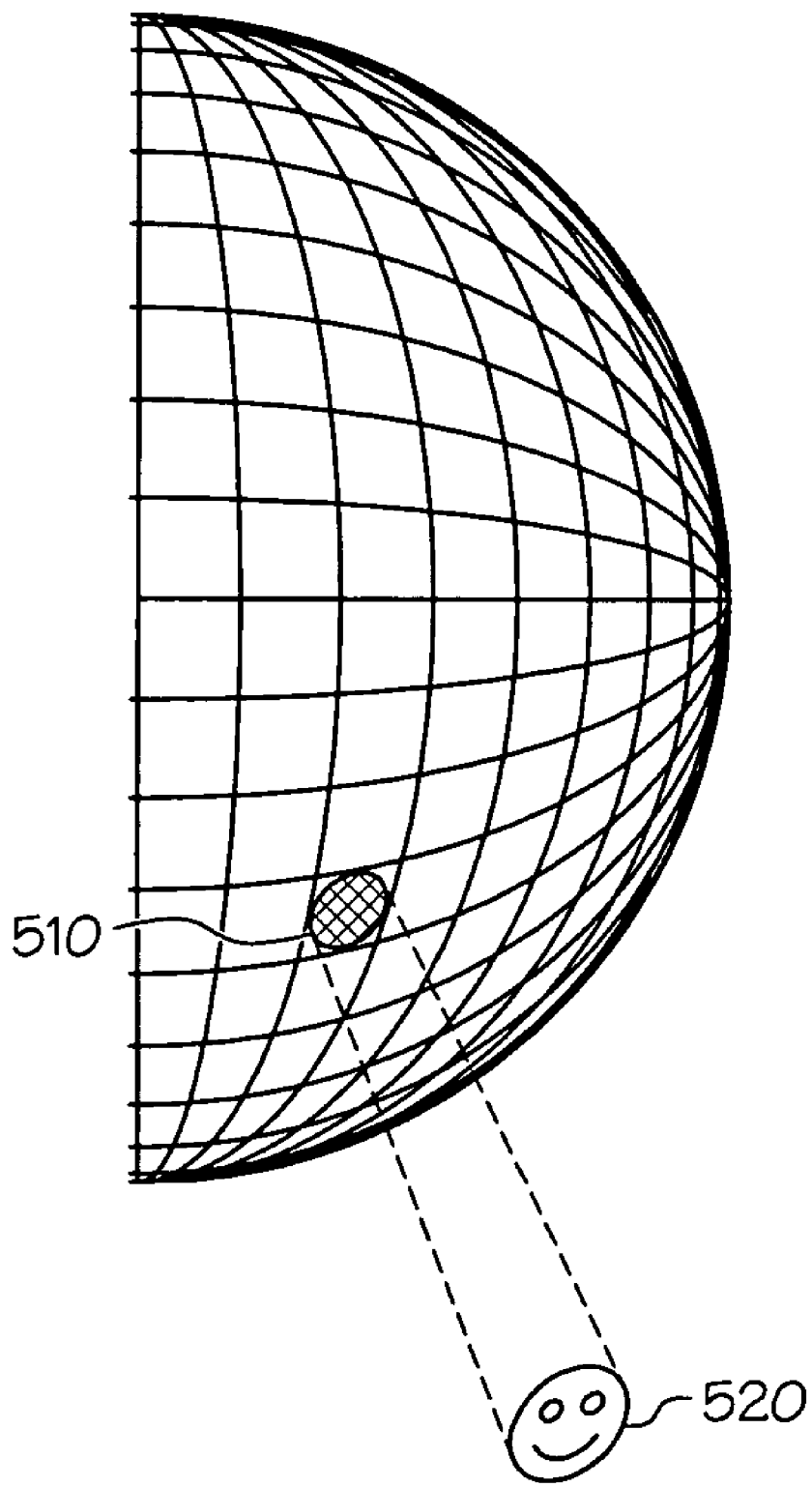
FIG. 5 represents an image portion replacement special effect in accordance with embodiments of the present invention.

Image portion replacement includes selecting at least one warped wide-angle image from image capture system 110 and selecting a portion of the wide-angle image for replacement with a predetermined image. For example, using the arrangement described above and shown in FIG. 2, video cameras 210 and 220 having fisheye lenses capture wide-angle video images that are warped (e.g., the captured wide-angle video images are substantially hemispheric), as shown in FIG. 3A. FIG. 5 illustrates image portion replacement for wide-angle image 320 from video camera 220. The video images are mapped using, for example, spherical coordinates, and a portion 510 of the images is selected for replacement using, for example, the spherical coordinates. Selected portion 510 is removed and a predetermined image 520 is placed in the same location as selected portion 510. Predetermined image 520 can have the same shape as the selected portion 510 and is warped to have the same curvature of the selected portion of the wide-angle image.

The warped predetermined image 520 that replaces selected portion 510 of the wide-angle image may be created, for example, using a conventional computer-aided design (CAD) program having the capability to create warped images. Alternatively, a planar image may be created, for example, using a well-known paint program and warped to have the same curvature of the wide-angle image. For example, transforms, which may be derived from transforms disclosed in U.S. Pat. No. 6,002,430 patent, can be used to convert the planar image to a warped image that has the same curvature as the selected portion of the wide-angle image. Also, the planar image that is warped can have the same size as the selected portion for replacement.

Additionally, the image portion replacement special effect may be provided for video images and still images. For video images, a selected portion in one or more wide-angle images in one or more frames of the video images is replaced with warped predetermined image 520.

In another preferred embodiment of the present invention, shifted image portion replacement for wide-angle video images is provided using preprocessing circuitry 120. Shifted image portion replacement, similar to the image portion replacement special effect described above, allows a selected portion of a video image to be replaced with a selected portion of another captured video image. For example, when wide-angle video images from image capture system 110 are stored and/or converted to a video file, which may include conventional formats such as AVI or MPEG, a selected portion of a wide-angle video image from one video frame can be replaced with an associated selected portion of a wide-angle video image from another video frame.

Figure 6A:
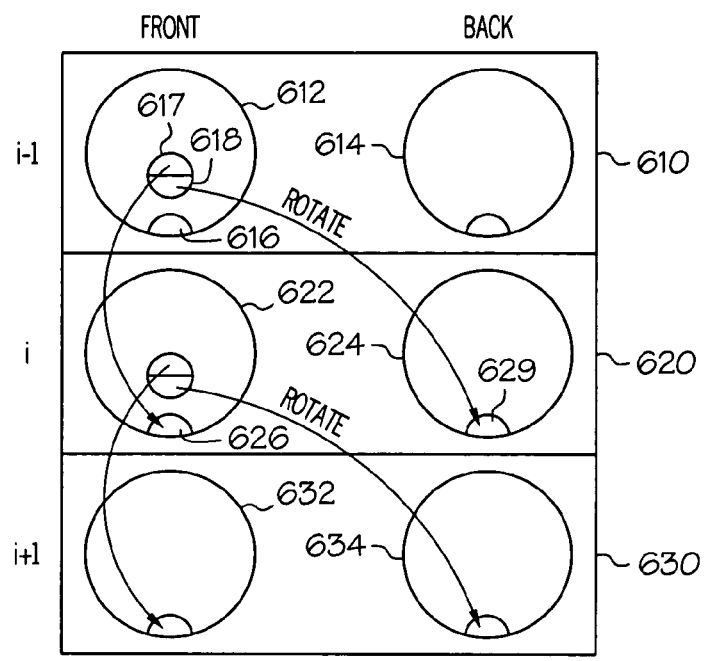
FIG. 6 represents a shifted image portion replacement special effect in accordance with embodiments of the present invention.
Figure 6B:
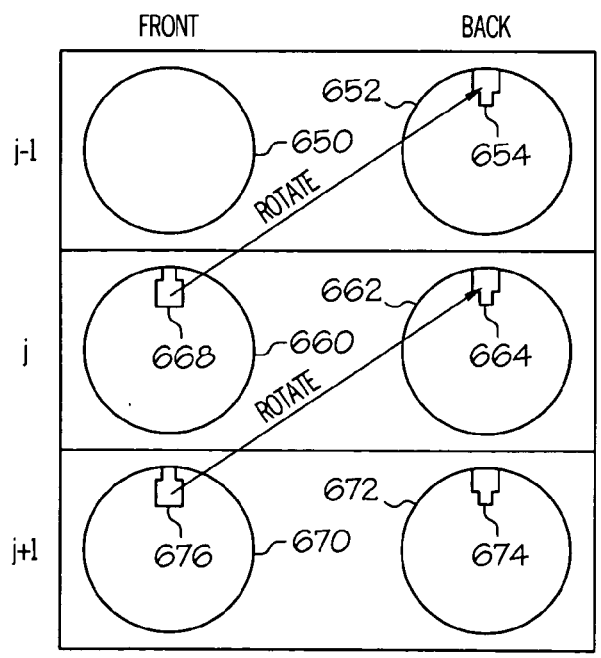

FIGS. 6A–6B illustrates shifted image portion replacement. Using, for example, video image capture system 110 illustrated in FIG. 2, video cameras 210 and 220 capture the environment in the forward and aft directions of robot 240 as robot 240 moves through the environment. The captured video images include a series of frames that include frames 610–630. Each frame includes, for example, two hemispheric images 310 and 320 captured from video cameras 310 and 320 respectively. Frames 610–630 can include other information (not shown) associated with each hemispheric image set, such as position and audio data, as described above and illustrated in FIG. 4.

As described above, hemispheric images 310 and 320 represent wide-angle video images having a field-of-view of at least 180 degrees. Therefore, a portion of the video images may be obstructed, for example, by a structure supporting the video capture device or a vehicle carrying the image capture device. For example, video images from video cameras 210 and 220 are obstructed by platform 235 of robot 240. Frames 610–630 each include front and back hemispheric images 310 and 320 representing the surrounding environment. Platform 235, captured at the bottom of each image, obstructs the field-of-view for the environment below platform 235. However, objects in the environment obstructed by platform 235 in images 622 and 624 were not obstructed in image 612 in the previous frame. The obstructed areas of images 622 and 624 are 626 and 629, respectively. The images being blocked by 626 and 629 were previously recorded in image 612 as images 617 and 618. In order to approximate the blocked images in images 622 and 624, the system replaces image area 626 with image area 617 and replaces image are 629 with a rotated version of image area 618. Likewise, the blocked areas of the image in images 626 and 629 may be obtained from image 622.

Another example is illustrated in FIG. 6B in which the camera system is mounted, for example, below and in front of a helicopter, wherein the forward image is not blocked and the backward image is partially blocked along the top of the image by the helicopter and/or camera mount. In this example, a forward image is used to correct a fill in a blocked region of a backward image of a previous frame. For example, in the present frame j, the forward image 660 is not blocked by the helicopter but the backward image 662 is partially blocked 664 by the helicopter and/or mount. The image area 668, which is an inverse of the blocked area 654 in image 652, may be obtained from image 660 and rotated by 180 degrees to approximately fill the blocked image 654. Likewise, the image area 676 may be used to approximately fill the blocked image area 664 in image 662. It is appreciated that the forward looking image may need to be converted in dimension and shape to comport with the outline of the supporting structure.

Figure 8A:
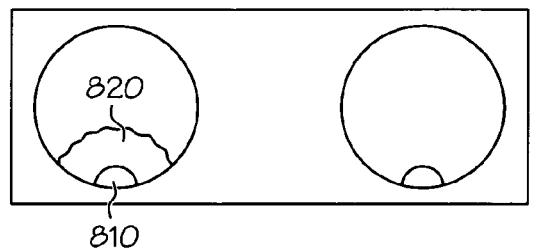
FIG. 8 illustrates a sampling and blending operation to fill a blank section of an image in accordance with embodiments of the present invention.
Figure 8B:
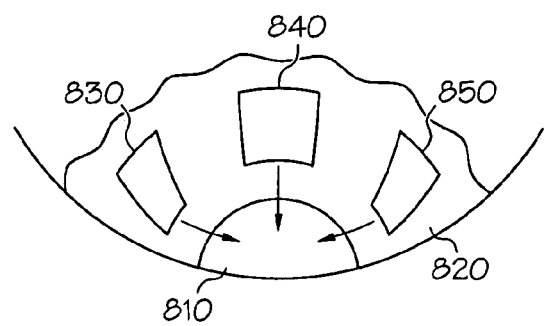

According to another embodiment of the invention, the portions of the images that are blocked by a camera mount or a transportation vehicle can also be filled by sampling the regions around the blocked image and creating a blending image as illustrated in FIGS. 8A–8B. In FIG. 8A, the portion of the image that is blocked is represented by 810. A region around the blocked image can then be designated by the system as the area 820. As illustrated in FIG. 8B, samples 830, 840 and 850 can be taken from the area 820 and blended together to fill in the region 810. An illustrative sampling and blending process is disclosed in PCT Application No. PCT/US99/07667 filed on Apr. 8, 1999, which is incorporated herein by reference.

A subsequent frame that includes objects of the environment previously obstructed by, for example, a video image capturing device support structure, can be identified using the velocity of the vehicle carrying the image capture device, the shape of the selected portion of the video image representing the obstructed objects and the image capture rate of the video image capturing device. In addition the position of the unobstructed objects in the subsequent frame can be identified using the same information if the vehicle travels in one direction between the time the video image in the frame having the obstructed objects is captured (e.g., frame 610) and the time the video image in the subsequent frame having the unobstructed objects (e.g., frame 630).

Therefore, it may be necessary to increase the image capture rate when the vehicle carrying the video image capture device is travelling at a high rate of velocity in order to minimize nonlinear movement of the vehicle between the time the video images in the relevant frames are captured. Alternatively, if position data for the vehicle carrying the video image capture device is available, such as provided by a conventional GPS receiver, the position of the unobstructed objects in a subsequent frame may be determined regardless whether the vehicle changes direction between the time the video images in the relevant frames are captured.

Also, preprocessing circuitry 120 can compare the image intensity of the replacement selected portion, such as selected portion 650 in frame 630, with the image intensity of surrounding portions of the video image, such as portions of video image 310 surrounding selected portion 650 in frame 610. If the comparison yields a contrast larger than a predetermined value, a predetermined image, such as predetermined image 520 described in the previous embodiment, can be used as a replacement portion. The predetermined image can have the same shape and is warped to the same curvature of the selected portion. Alternatively, if the comparison yields a contrast larger than a predetermined value, the selected portion may not be replaced. Also, instead of image intensity, other aspects of the selected portion or the entire image that are known in the art (e.g., aspects related to image quality) may be evaluated for determining whether to replace the selected portion of the video image.

Additionally, other special effects can be performed using preprocessing circuitry 120. For example, preprocessing circuitry 120 can provide image intensity scaling for one or more wide-angle images in each video frame that emulates the functionality of a mechanical iris by shifting the intensity of the displayed video image based upon, for example, predetermined parameters or commands entered by the user. Image intensity may vary throughout a wide-angle vide image. For example, the image may be bright on top and dark on the bottom or bright in the center and dark on the edges. Preprocessing circuitry 120 can change the image intensity of pixels to blend the bright and dark areas of a wide-angle video image. The wide-angle image can be divided into a plurality of areas. The average image intensity of each area is calculated. The image intensity of each pixel in each area is compared to, for example, the average image intensity of each pixel's respective area. The image intensity of each pixel may be adjusted accordingly (e.g., adjusted to be brighter or darker), if the pixel's image intensity is not equal to the threshold. The threshold can, for example, be a range of values associated with the average intensity of the respective area.

Figure 7:
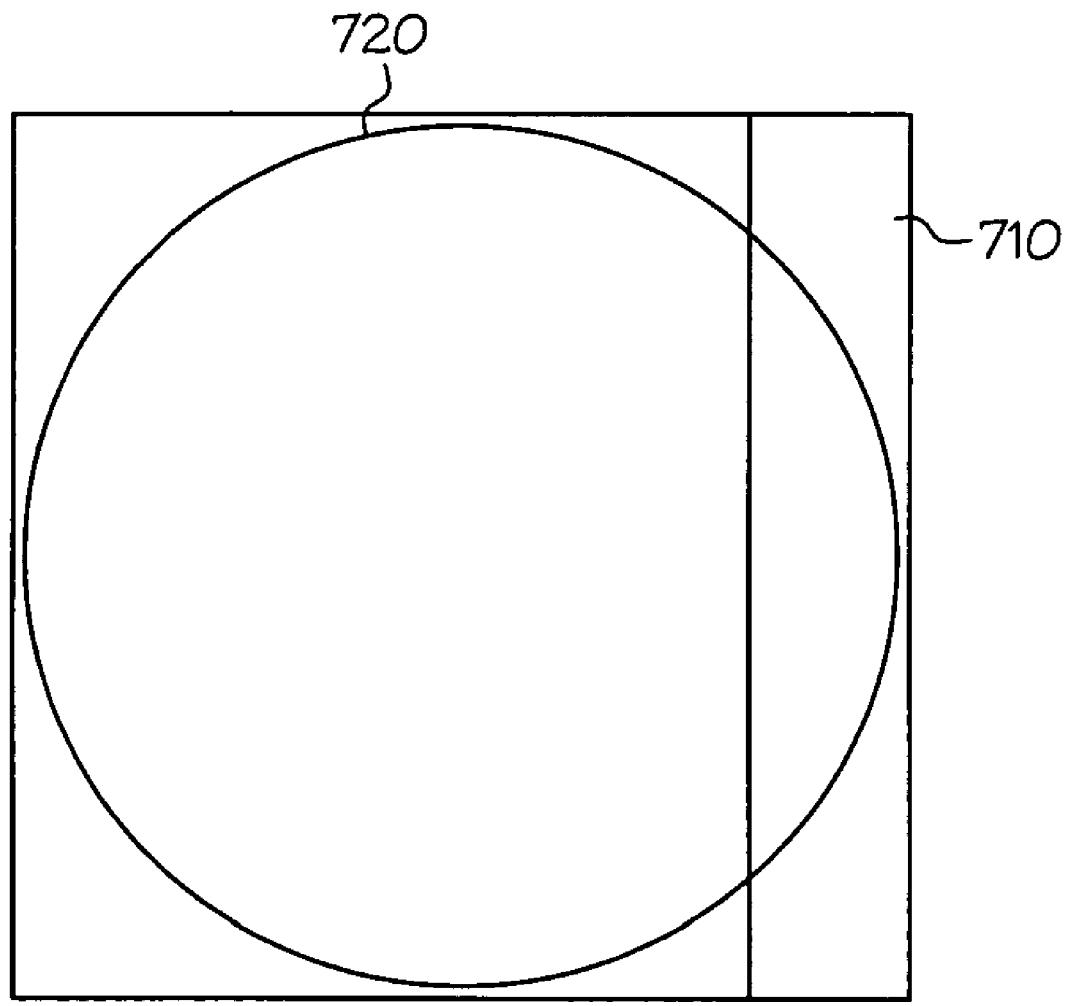
FIG. 7 shows flare in a wide-angle video image in accordance with embodiments of the present invention.

Preprocessing circuitry 120 may also provide flare detection and removal. FIG. 7 shows flare 710, comprised of a vertical line of high intensity pixels, for wide-angle image 720. Vertical edge detection can be applied for each wide-angle video image in each frame for detecting flare. Each image includes a plurality of rows of pixels. The difference, for example, between the average intensity of each pixel in a row is compared to a first threshold that, for example, allows for a relatively large change in intensity to detect high intensity pixels. If an entire vertical line of pixels having abnormally high change in intensity is not detected, another comparison can be made to a second, less sensitive threshold, that allows for a relatively smaller change in intensity to detect pixels having abnormal high change in intensities. The results of the two comparisons can be correlated to detect flare 710. Once flare is detected, pixels having an intensity relative to the intensity of pixels proximate the flare may be filled in each row across the flare.

An example of flare removal will now be described. First, a vertical edge detection is performed using a high pass filter, such as a vertical Huff filter. A second vertical edge detection is the performed using a medium pass filter. The data gathered from the two vertical edge detections are then AND together to define the area of the flare. A filter is then created to remove the area of the flare from the image. The system then determines the color of pixels on each side of the now blank area which used to be the area of the flare. A weighted average of the colors on each side of the area are used to fill the blank area. For example, if the pixels on one side of the blank area are red and the pixels are blue on the other side of the blank area, the blank area will be filled in such a manner that the color turns from red to blue as the pixels of the blank area are filled.

In addition, preprocessing circuitry 120 may perform other types of special effects and image filtering techniques for each wide-angle image in each frame of wide-angle video. For example, color-matching, seam-blending of the two hemispheric images and known video filtering techniques can be performed on each wide-angle image. Also, audio tracks or audio captured simultaneously with the wide-angle video can be added to the wide-angle video.

What has been described are the preferred embodiments of the present invention. It, however, will be apparent to those skilled in the art that it is possible to embody the invention in specific forms other than those disclosed in the preferred embodiments described above. This may be done without departing from the spirit of the invention, and the preferred embodiments are merely illustrative and should not be considered restrictive in any way. The scope of the invention is given by the appended claims, rather than the preceding description.

We claim:

1. A method of processing video images, comprising:
   a) receiving first image data representing an immersive video of an environment, the immersive video having been captured with a video image capture system, the immersive video having a wide-angle field of view and a plurality of frames, wherein at least a portion of the image capture system obstructs a portion of the view of the environment and one or more frames includes an image of the obstructing portion of the image capture system; and
   b) modifying one or more frames of the immersive video, the step of modifying comprising the step of replacing data representing the image of at least a portion of the image capture system with other image data representing an unobstructed view of at least said obstructed portion to produce a processed immersive video having an unobstructed immersive image.

2. The method of claim 1, wherein the first image data is received via wireless transmission.

3. The method of claim 1, wherein the first image data is received via transmission from said image capture system.

4. The method of claim 3, wherein the transmission of the first image data and the capture of the immersive video are substantially contemporaneous.

5. The method of claim 3, wherein the step of receiving the first image data via transmission from said image capture system includes downloading said first image data from a memory device in the image capture system.

6. The method of claim 1, wherein the first image data is received stored in a tangible computer readable medium.

7. The method of claim 1, wherein said wide-angle field of view is a spherical field of view.

8. The method of claim 1, the other image data having been captured with the image capture system.

9. The method of claim 8, wherein the other image data originates from one or more frames in the immersive video.

10. The method of claim 1, wherein the step of modifying includes modifying the other image data.

11. The method of claim 10, wherein the image of at least a portion of the image capture system has a curvature, and wherein the step of modifying includes warping the image represented by said other image data to substantially the same curvature as said image of at least a portion of the image capture system.

12. The method of claim 11, wherein said other image data represents a planar image prior to warping.

13. The method of claim 1, further comprising the step of:
c) modifying at least one of at least a portion of the first image data and at least a portion of the other image data to balance image intensity about the unobstructed image in the processed immersive video.

14. The method of claim 1, the step of modifying including removing the image of at least a portion of the image capture system from at least one of said frames to leave a remainder image, wherein said other image data is derived from said remainder image.

15. A system operable to carry out the steps comprising the method of claim 1.

16. A computer readable medium comprising instructions executable by a computer to perform the method of claim 1.

17. A method of processing video images, comprising:
a) receiving first image data representing an immersive video of an environment, the immersive video having been captured with a video image capture system, the immersive video having a wide-angle field of view and a plurality of frames, wherein at least a portion of the image capture system obstructs the view of the environment and one or more frames includes an image of the obstructing portion of the image capture system; and
b) modifying one or more frames of the immersive video, the step of modifying comprising the step of superimposing an image represented by other image data over the image of at least a portion of the image capture system to represent an unobstructed view of the environment.

18. A method of processing video images, comprising:
a) acquiring a plurality of video images of an environment, said video images having been captured by a video capture system, wherein at least one of said video images includes an image of at least a portion of said video capture system obstructing at least a portion of said environment, wherein said video images comprise a plurality of frames, at least two of said frames representing substantially contemporaneous images captured at substantially the same moment in time;
b) seaming together at least two of said substantially contemporaneous images to create a seamed immersive image of said environment at said moment in time, said seamed immersive image including an image of at least a portion of said video capture system obstructing at least a portion of said environment; and
c) modifying said seamed immersive image to represent an unobstructed immersive view of said environment.

19. A method of processing video images, comprising:
a) acquiring a plurality of video images of an environment, said video images having been captured by a video capture system, wherein at least one of said video images includes an obstructed image, said obstructed image comprising an image of at least a portion of said video capture system obstructing at least a portion of said environment, wherein said video images comprise a plurality of frames, at least two of said frames representing substantially contemporaneous images captured at substantially the same moment in time;
b) modifying at least one of said obstructed images to represent an unobstructed view of said environment; and
c) seaming together said substantially contemporaneous images to create a seamed immersive image of said environment at said moment in time.

20. A method of processing video images, comprising:
a) acquiring video image data representing an immersive view of an environment, said image data having been captured by an image capture system, wherein the image capture system comprises a support member, wherein said immersive view includes an image of at least a portion of said support member obstructing at least a portion of said environment;
b) assembling said video image data into an immersive video; and
c) modifying image data representing said image of at least a portion of said support member to represent an unobstructed immersive view of said environment.

* * * * *